J. F. MEINERS.
Improvement in Preserving Meat, &c.
No. 127,627.          Patented June 4, 1872.
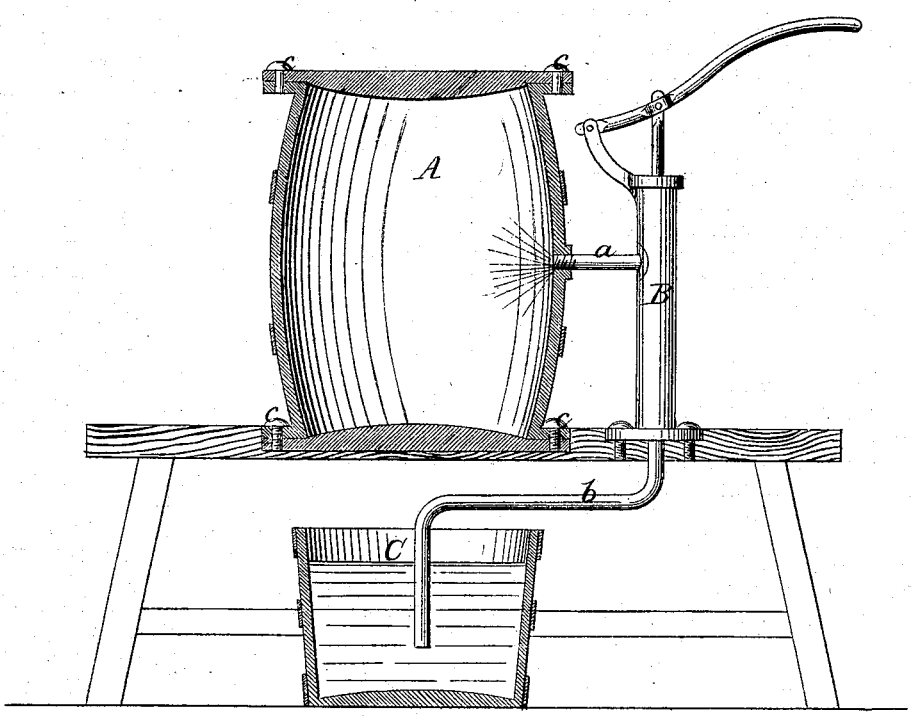

127,627

UNITED STATES PATENT OFFICE.

JOHANN F. MEINERS, OF NEW YORK, N. Y.

IMPROVEMENT IN PRESERVING MEATS, &c.

Specification forming part of Letters Patent No. 127,627, dated June 4, 1872.

*To all whom it may concern:*

Be it known that I, JOHANN FRIEDERICH MEINERS, of the city, county, and State of New York, have invented a new and Improved Process for Curing and Preserving Meat; and I do hereby declare the following to be a full, clear, and exact description thereof, which will enable those skilled in the art to make and use the same, reference being had to the accompanying drawing forming part of this specification, which drawing represents a vertical section of the apparatus which I use in carrying out my invention.

This invention consists in placing the meat to be treated in a cask or vessel, which is hermetically closed, and which connects with a double-acting pump, the suction-pipe of which extends into a vessel or reservoir containing brine or other antiseptic liquid, in such a manner that, by operating said pump, the brine is forced into the cask under pressure, and thereby the brine is caused to penetrate through all parts of the meat in a short time; and, furthermore, the pump can be used for removing the surplus brine from the cask.

In the drawing, the letter A designates a cask, which connects by a pipe, *a*, with a force-and-suction pump, B. The suction-pipe *b* of this pump extends into a reservoir, C, containing brine or other antiseptic liquid used for impregnating the meat.

The cask A is filled with meat cut in pieces of suitable size, and the heads of said cask are secured in their places by means of screws *c*, so that the same will not be blown out if pressure is applied to the interior of the cask. After the cask has been hermetically closed the pump is set in motion and the liquid from the reservoir C is forced into the cask. As the cask fills up the power necessary to force in the liquid increases, and by these means the meat contained in the cask is impregnated with the brine or other antiseptic liquid in a very short time; and, furthermore, the liquid is caused to penetrate uniformly to all parts of the meat, so that the same will be preserved from putrefaction for a long time. After the meat in the cask has been thoroughly impregnated with the antiseptic liquid the suction-pipe of the pump is connected with the cask, and the delivery-pipe is conducted into the reservoir C, and the surplus liquid is readily removed from the cask, leaving the meat in a comparatively dry condition, ready for almost immediate use.

What I claim as new, and desire to secure by Letters Patent, is—

The process, substantially as herein described, for impregnating meat with brine or other antiseptic liquid by placing the meat in a cask, which can be hermetically closed, and then forcing the antiseptic liquid into said cask by means of a force-pump, which pump also serves to remove the surplus liquid from the cask, as set forth.

This specification signed by me this 2d day of May, 1872.

JOHANN FRIEDERICH MEINERS.

Witnesses:
  W. HAUFF,
  E. F. KASTENHUBER.